United States Patent
Fu

(10) Patent No.: US 7,600,110 B2
(45) Date of Patent: Oct. 6, 2009

(54) METHOD FOR SIMULATING AN INTELLIGENT PLATFORM MANAGEMENT INTERFACE USING BIOS

(75) Inventor: Hsin-Teng Fu, Taipei Hsien (TW)

(73) Assignee: Giga-Byte Technology Co., Ltd., Tapei Hsien (TW)

( * ) Notice: Subject to any disclaimer, the term of this patent is extended or adjusted under 35 U.S.C. 154(b) by 520 days.

(21) Appl. No.: 11/483,722

(22) Filed: Jul. 11, 2006

(65) Prior Publication Data
US 2008/0059784 A1  Mar. 6, 2008

(51) Int. Cl.
*G06F 15/177* (2006.01)
(52) U.S. Cl. .................. 713/2; 713/1; 713/100
(58) Field of Classification Search ............. 713/2, 713/1, 100
See application file for complete search history.

(56) References Cited

U.S. PATENT DOCUMENTS

| | | | | |
|---|---|---|---|---|
| 6,772,376 | B1 * | 8/2004 | Merkin et al. ............... | 714/48 |
| 7,124,412 | B2 * | 10/2006 | Fish et al. .................. | 719/310 |
| 7,293,165 | B1 * | 11/2007 | Tobias ........................ | 713/1 |
| 7,426,592 | B2 * | 9/2008 | Chen ......................... | 710/104 |
| 2006/0136703 | A1 * | 6/2006 | Wisecup et al. ............. | 713/2 |
| 2007/0234123 | A1 * | 10/2007 | Shih et al. .................. | 714/36 |

\* cited by examiner

*Primary Examiner*—Nitin C Patel
(74) *Attorney, Agent, or Firm*—Birch, Stewart, Kolasch & Birch, LLP

(57) ABSTRACT

A method for simulating IPMI using BIOS. A memory space is defined in a memory storing BIOS for storing a BMC module. The BIOS provides a setup menu comprising an enabling option for enabling or disabling a BMC function. It is determined whether the BMC function is enabled. If so, the BIOS detects and regards an error as an error message. The error message is stored in the memory space storing the BMC module and generating a system event log.

5 Claims, 3 Drawing Sheets

METHOD FOR SIMULATING AN INTELLIGENT PLATFORM MANAGEMENT INTERFACE USING BIOS

BACKGROUND OF THE INVENTION

1. Field of the Invention

The invention relates to an intelligent platform management interface (IPMI), and in particular to a method for simulating an IPMI using BIOS.

2. Description of the Related Art

IPMI is a message-based hardware management interface that is implemented at the silicon level and uses a baseboard management controller, which is a small processor that sets up IPMI as a subsystem independent of the CPU of a server or operating system. IPMI enables remote monitoring, management and recovery capabilities, regardless of the status of the server. IPMI can be exposed through any standard management software interface such as Common Information Model, Simple Network Management Protocol (SNMP) and Windows Management Instrumentation. It can also feed into higher-level management software such as HP's OpenView.

When errors for a server system are detected, system BIOS records event logs in an IPMI module for reference by management information system (MIS) engineers for maintenance of the server system. When an unrecoverable error, for example, a system memory error is detected, the system BIOS records an error message for the unrecoverable error in a memory (Electrically Erasable Programmable Read-Only Memory (EEPROM), for example) of the IPMI module. MIS engineers or users query the error message in the memory of the IPMI module using tool applications to analyze and maintain the system server.

Currently, IPMI modules are implemented using hardware circuits combining IPMI chips and present an additional cost to users.

Thus, the invention provides a method for simulating an IPMI using BIOS, recording system event logs (SEL) using BIOS firmware, comprising BIOS software and a memory (EEPROM, for example) storing the BIOS software, to simulate an IPMI module and a memory of the IPMI module, thereby achieving IPMI functions and reducing costs. Additionally, the BIOS software provides a tool application for error message querying.

BRIEF SUMMARY OF THE INVENTION

A method for simulating IPMI using BIOS is provided. A memory space is defined in a memory storing BIOS for storing a Basic Management Control (BMC) module. The BIOS provides a setup menu comprising an enabling option for enabling or disabling a BMC function. It is determined whether the BMC function is enabled. If so, the BIOS detects and regards an error as an error message. The error message is stored in the memory space storing the BMC module and generating an event log A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
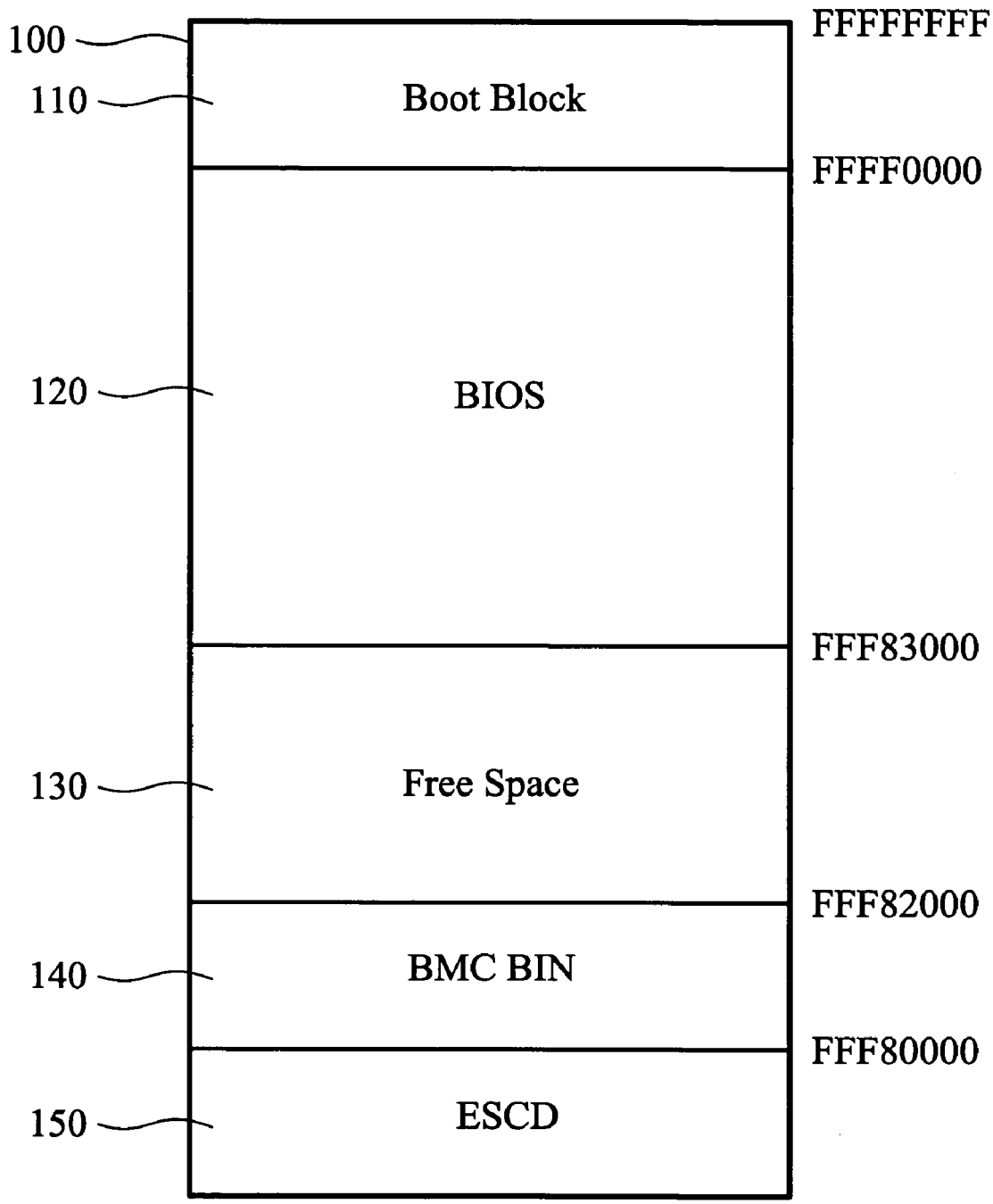
FIG. 1 is a view diagram of space allocation of a flash memory.

Several exemplary embodiments of the invention are described with reference to FIGS. 1 through 3, which generally relate to simulating an IPMI using BIOS. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various discussed embodiments and/or configurations.

The invention discloses a method for simulating IPMI using BIOS.

An exemplary embodiment of the method records system event logs (SEL) using BIOS firmware to simulate of an IPMI module and a memory (EEPROM, for example) of the IPMI module, called "Software Mini BMC Function", thereby reducing hardware cost for the IPMI. The BIOS firmware of the invention further provides a tool application for querying of system errors.

The simulation method of the invention comprises three phases of firmware space allocation (the BIOS layer), BIOS setup (the BIOS setup layer), and system event log view (the SEL viewer utility layer).

With respect to the firmware space allocation, a memory space (4096 bytes, for example, but is not to be limitative) of a flash ROM (Read Only Memory) storing the BIOS is defined to store a basic management control (BMC) module, applied to particularly record system event logs for simulation of EERPOM of an IPMI module and capable of determining the amount of the recording data based on the size of the memory space.

FIG. 1 is a view diagram of space allocation of a flash memory. Memory space 110 of flash memory 100 is a boot block with 64 bytes, storing required data and configuration settings for booting a system. Memory space 120 of flash memory 100 stores the BIOS. Memory space 130 of flash memory 100 is a free space, capable of storing data or other firmware programs. Memory space 140 of flash memory 100 stores the BMC module and comprises, but is not limited to, 4096 bytes to store more system event logs. Memory space 150 of flash memory 100 stores extended system configuration data (ESCD). The extended system configuration data can store configurations for plug and play devices and messages for non-plug and play devices to prevent device collisions.

With respect to the BIOS setup layer, the BIOS directly stores system event logs in memory space 140 when error messages are detected.

Referring to Attachment 1, the invention adds sections 1110 and 1120 to a BIOS setup menu, comprising configuring system event logs (Event Log Configuration), enabling or disabling the BMC function (Mini BMC Function [Enabled/Disabled]), erasing system event logs (Set Threshold), implementing the SEL viewer (Mini BMC SEL Viewer [Enter]), and opening or closing the final system event log (POST Event Log[Enabled/Disabled]).

With respect to the system event log viewer utility layer, the invention provides a system event log viewer (SEL viewer) to view event result details and erase all system event logs. Referring to Attachment 2, which displays system event logs when, the SEL viewer is executed.

Figure 2:
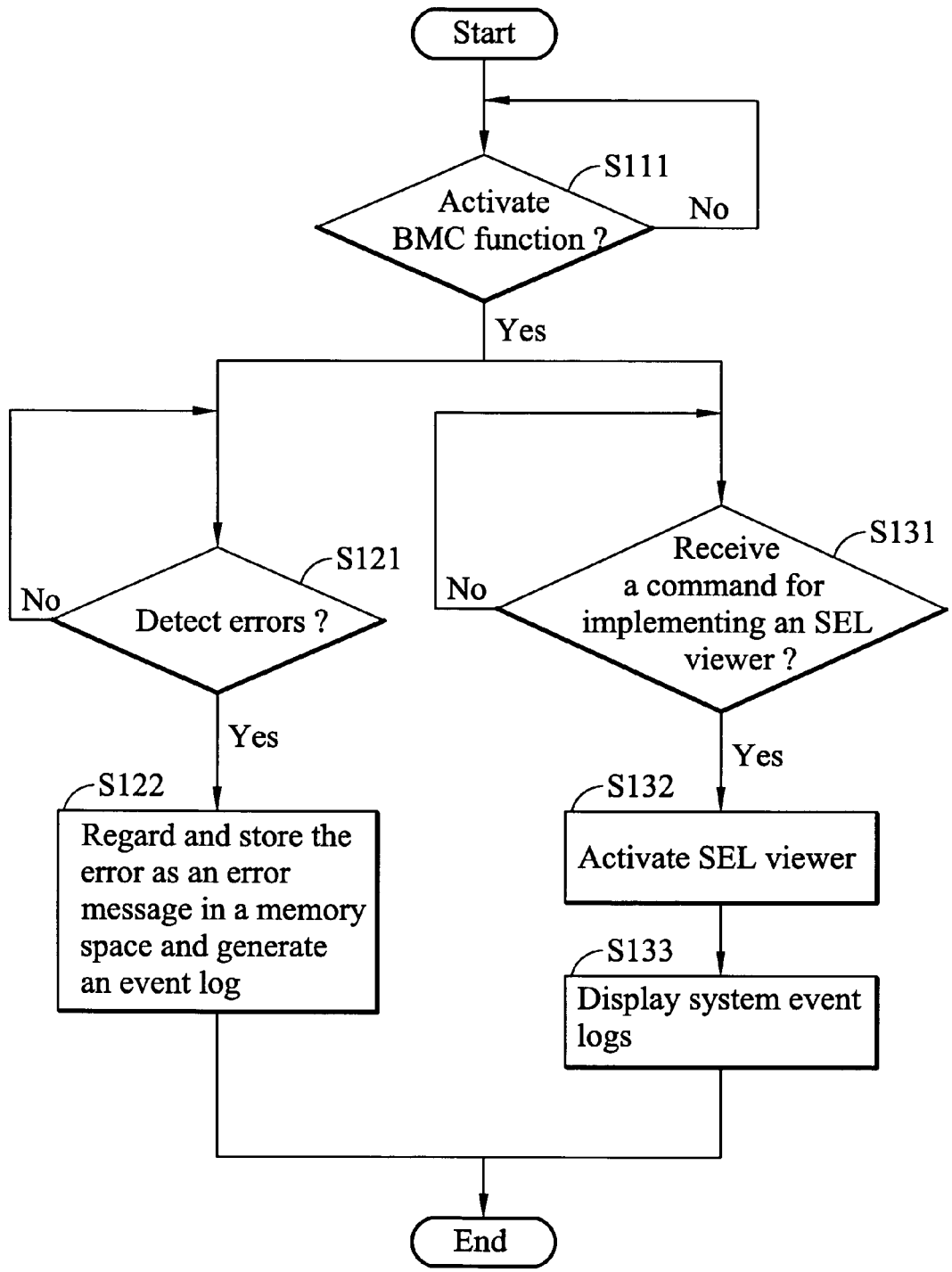
FIG. 2 is a flowchart of an embodiment of an embodiment of a method for simulating IPMI using BIOS.

FIG. 2 is a flowchart of an embodiment of a method for simulating IPMI using BIOS.

A memory space is first defined in a memory (a flash memory, for example) storing BIOS for storing a BMC module. The BMC module records system event logs. A plurality of options is added to a BIOS setup menu comprising configuring system event logs, enabling or disabling the BMC function, erasing system event logs, implementing SEL viewer, and opening or closing the final system event log. When a computer system is activated to execute a power-on self test (POST), the BIOS determines whether the BMC function is enabled (step S111). If the BMC function is enabled, the BIOS then determines whether an error is detected (step S121). If an error is detected, the error is regarded as an error message and is stored in the memory space storing the BMC module to generate a system event log (step S122). Further, the BIOS determines whether a command for implementing the SEL is received (step S131). If the command is received, the SEL viewer is activated (step S132) and system event logs are displayed (step S133).

Figure 3:
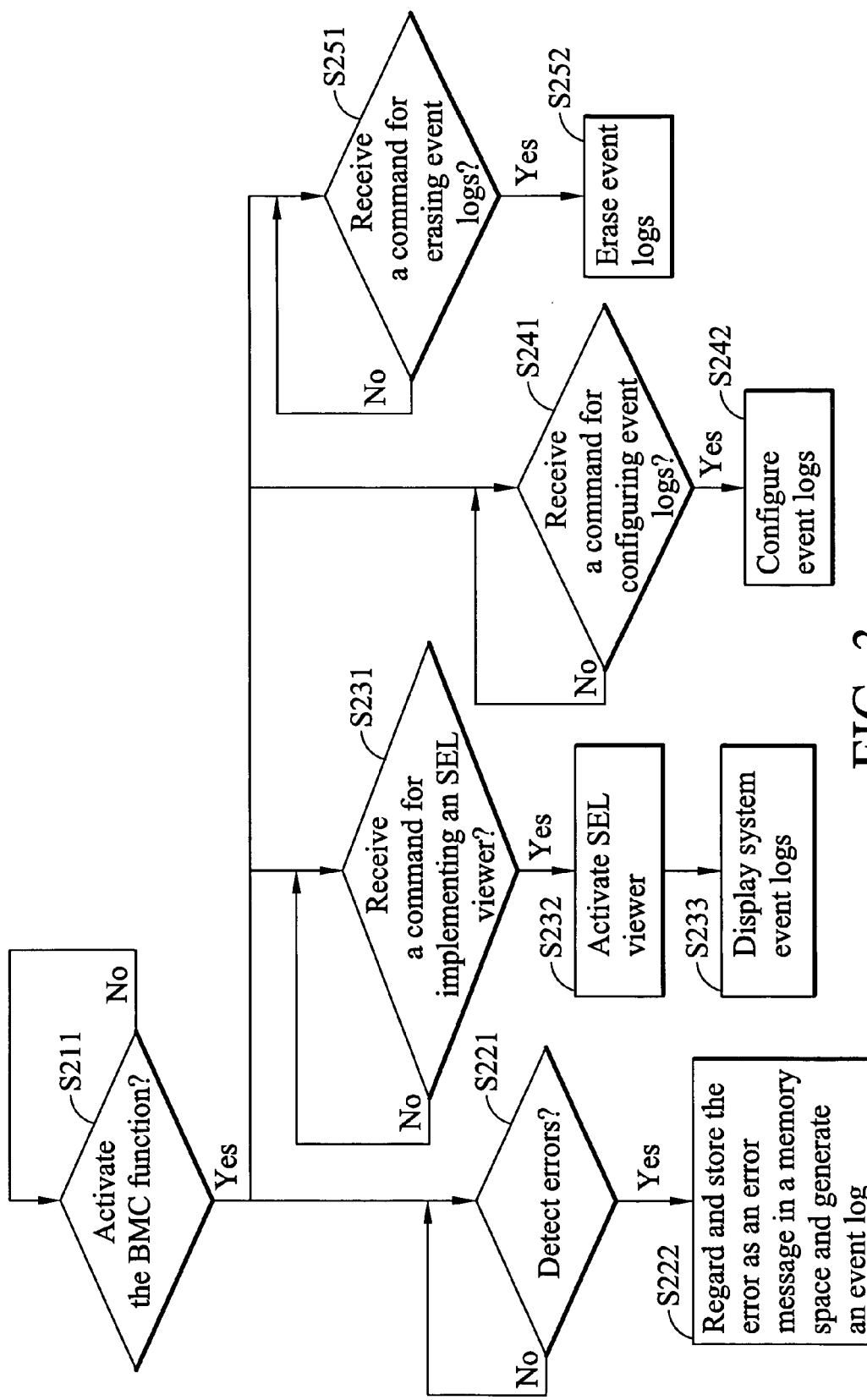
FIG. 3 is a detailed flowchart of an embodiment of an embodiment of a method for simulating IPMI using BIOS, providing other functions.

FIG. 3 is a detailed flowchart of an embodiment of a method for simulating IPMI using BIOS, providing other functions.

When a computer system is activated to execute a power-on self test (POST), the BIOS determines whether the BMC function is enabled (step S211). If the BMC function is enabled, the BIOS then determines whether an error is detected (step S221). If an error is detected, the error is regarded as an error message and is stored in the memory space storing the BMC module to generate a system event log (step S222).

Further, the BIOS determines whether a command for implementing the SEL is received (step S231). If the command is received, the SEL viewer is activated (step S232) and system event logs are displayed (step S233). Further, the BIOS determines whether a command for configuring system event logs (step S241). If the command is received, system event logs stored in the memory space storing the BMC module is configured (step S242). Further, the BIOS determines whether a command for erasing system event logs (step S251). If the command is received, system event logs stored in the memory space storing the BMC module is erased (step S252).

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for simulating an intelligent platform management interface (IPMI) using a basic input/output system (BIOS), wherein a memory space is defined in a memory storing BIOS for storing a basic management control (BMC) module, the BIOS provides a setup menu comprising an enabling option for enabling or disabling a BMC function, comprising:
   determining whether the BMC function is enabled;
   if so, the BIOS detecting and regarding an error as an error message; and
   storing the error message in the memory space storing the BMC module and generating a system event log.

2. The method for simulating IPMI using BIOS as claimed in claim 1, wherein the setup menu further comprises an event log configuration option, an event log erasure option, and an event log view option.

3. The method for simulating IPMI using BIOS as claimed in claim 2, the event log view option thereof further comprising:
   determining whether a command for implementing system event logs (SEL) is received;
   if so, activating a system event log viewer; and
   displaying the system event logs.

4. The method for simulating IPMI using BIOS as claimed in claim 2, the event log configuration option thereof further comprising:
   determining whether a command for configuring system event logs is received; and
   if so, configuring the system event logs.

5. The method for simulating IPMI using BIOS as claimed in claim 2, the event log erasure option thereof further comprising:
   determining whether a command for erasing system event logs is received; and
   if so, erasing the event logs from the memory space storing the BMC module.

* * * * *